(12) United States Patent
Ando et al.

(10) Patent No.: US 6,427,471 B1
(45) Date of Patent: Aug. 6, 2002

(54) AIR CYCLE MACHINE AND AIR CONDITIONING SYSTEM USING THE SAME

(75) Inventors: Masanao Ando, Kyoto; Osamu Satoh, Otsu; Shoji Uryu; Koichi Ohara, both of Kyoto, all of (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 09/785,560

(22) Filed: Feb. 20, 2001

(30) Foreign Application Priority Data

Feb. 29, 2000 (JP) .................... 2000-052803
Jun. 20, 2000 (JP) .................... 2000-185418

(51) Int. Cl.[7] .............. F25D 9/00; F25B 9/00
(52) U.S. Cl. .......................... 62/402; 62/88
(58) Field of Search ................ 62/402, 87, 88, 62/172

(56) References Cited

U.S. PATENT DOCUMENTS

| | | | | |
|---|---|---|---|---|
| 3,623,332 A | * | 11/1971 | Fernandes | 62/88 |
| 4,262,495 A | * | 4/1981 | Gupta et al. | 62/402 |
| 5,373,707 A | * | 12/1994 | Ostersetzer et al. | 62/401 |
| 5,704,218 A | * | 1/1998 | Christians et al. | 62/172 |
| 5,860,283 A | * | 1/1999 | Coleman et al. | 62/87 |
| 5,906,111 A | * | 5/1999 | Lui | 62/402 |
| 5,921,093 A | * | 7/1999 | Jonqueres | 62/86 |
| 6,058,715 A | * | 5/2000 | Strang et al. | 62/87 |
| 6,070,418 A | * | 6/2000 | Crabtree et al. | 62/86 |
| 6,148,622 A | * | 11/2000 | Sanger | 62/88 |
| 6,295,822 B1 | * | 10/2001 | Mueller | 62/172 |

* cited by examiner

Primary Examiner—William C. Doerrler
(74) Attorney, Agent, or Firm—Kanesaka & Takeuchi (57) ABSTRACT

In an air cycle machine, a turbine is driven by an engine bleed air, and the turbine power is mechanically transmitted to a compressor to compress the engine bleed air or open air. An electric motor may be provided to electrically drive the compressor, if necessary, to thereby serve as an auxiliary power for the turbine power. The air cycle machine is used for an air conditioning system for an aircraft, wherein open air or engine fan air is raised in its pressure by taking advantage of the compressor driven by the turbine power to use as a ventilation air. Therefore, a consumption of the engine bleed air having a high energy level can be efficiently reduced.

8 Claims, 5 Drawing Sheets

AIR CYCLE MACHINE AND AIR CONDITIONING SYSTEM USING THE SAME

BACKGROUND OF THE INVENTION

The invention relates to an air cycle machine to be used in a transport machinery, such as an aircraft, shipping and vehicle, and an air conditioning system using the same, especially, an air conditioning system for an aircraft for supplying pressurized air into a cabin of the aircraft, and ventilating the same accompanied by heating and cooling.

For example, an aircraft generally includes an air conditioning system for supplying conditioned air with optimum temperature and pressure to a pressurized cabin or chamber, such as an accommodation compartment and an electronics' chamber. The air conditioning system plays various roles, such as dehumidifying, supplying oxygen to the pressurized cabin and making up for leaked air, in addition to regulating temperature and pressure of air. To play these roles, it is indispensable to take open or outside air.

In case the open air is taken as described above, if air cooling is made only by ram air, it can not respond immediately. Also, it is impossible to obtain a sufficient pressure necessary for the pressurization from thin ram air during a high altitude flight. If the open air is taken as it is, pressure and oxygen quantities necessary for the pressurized cabin can not be obtained. Therefore, there has been established an air conditioning system, wherein bleed air is obtained from an engine (including an auxiliary power portion) where a sufficient quantity of the open air always exists, and the temperature and pressure of the engine bleed air are regulated to supply to the pressurized cabin as air conditioned or regulated air.

Figure 1:
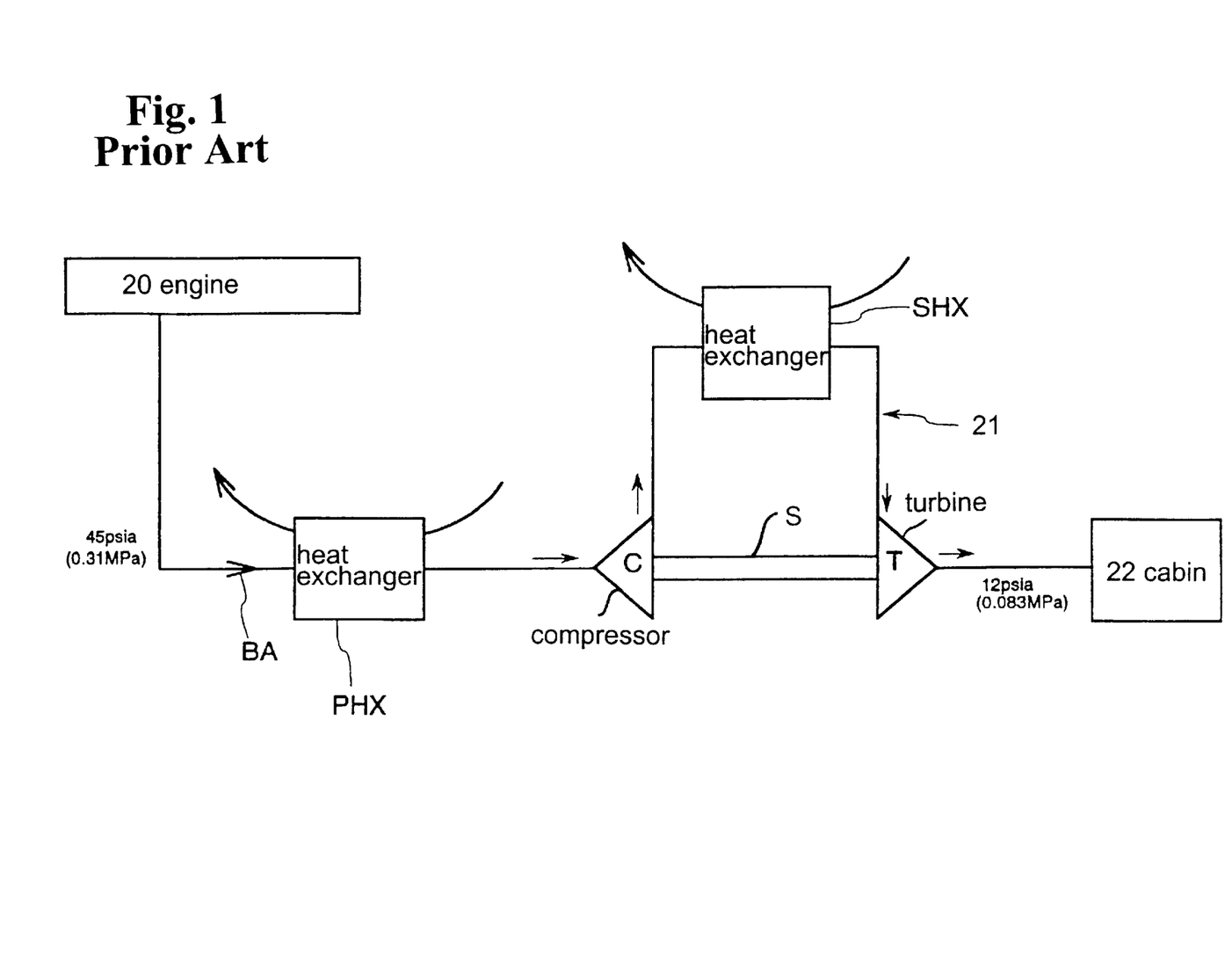
FIG. 1 is a block diagram showing a conventional air conditioning system.

An air cycle machine ACM of the air conditioning system as a main part thereof is generally structured such that, as shown in FIG. 1, a turbine T is driven by engine bleed air BA of an engine 20, the turbine power is transmitted to a compressor C connected by a single shaft, and the engine bleed air BA to be supplied to the turbine T is compressed by the compressor C and supplied to a pressurized cabin 22. In FIG. 1, reference numeral 21 represents a bootstrap circuit for supplying the engine bleed air BA discharged from the compressor C to the turbine T, and PHX and SHX represent heat exchangers.

In the structure as described above, since a work more than the turbine power can not be done by the compressor, it is indispensable to balance a work quantity of the compressor and the turbine power.

However, in case the driving power of the turbine relies on only the engine bleed air, a performance of the air cycle machine is inevitably governed by the bleed air pressure and flow quantity. For example, when the bleed air flow quantity is small, the turbine power is reduced to thereby lower the performance of the air cycle machine, which results in lowering a cooling performance of the whole air conditioning system. Therefore, with the structure of the conventional air cycle machine, there is a problem such that an effective flight and a suitable air conditioning are incompatible.

Also, in a passenger airplane where a large number of passengers are on board, a large quantity of ventilation air is required. Thus, in case the whole necessary quantity of ventilation air is taken from the engine bleed air, the quantity of the engine bleed air is increased and an engine penalty (fuel consumption) is increased to thereby greatly reduce an efficiency of the aircraft.

In order to solve the above problems, the present invention has been made, and an object of the invention is to provide an air cycle machine and an air conditioning system using the same, wherein air conditioning can be effectively made by using bleed air and open air.

SUMMARY OF THE INVENTION

According to a first aspect of the invention, in an air cycle machine, a turbine is driven by an engine bleed air, and a turbine power is mechanically transmitted to a compressor. The engine bleed air to be sent to the turbine is compressed by the compressor, and if necessary, the compressor is electrically driven to thereby structure a hybrid-type air cycle machine.

When the air cycle machine is structured as described above, even if the turbine power is decreased pursuant to the decrease in the flow rate and pressure of the engine bleed air, the turbine can also be electrically driven to provide a predetermined turbine power and raise a compression ratio of the compressor, so that an expansion ratio of the turbine is increased. Therefore, a temperature at the exit of the turbine is lowered to thereby prevent the cooling ability from being lowered.

According to a second aspect of the invention, there is provided an air conditioning system using the hybrid-type air cycle machine, wherein the engine bleed air is introduced into the compressor to be compressed therein, is cooled in the heat exchanger, and then is subjected to an adiabatic expansion in the turbine to self-cool to thereby obtain conditioned air without requiring a high-pressure bleed air source, what is called, to structure a bootstrap circuit.

According to a third aspect of the invention, there is provided another air conditioning system using the hybrid-type air cycle machine as described above, wherein the engine bleed air is introduced into the turbine to drive the same, while the open air is taken to be compressed at the compressor to thereby structure a circuit for obtaining conditioned air from the compressed open air and the bleed air expanded at the turbine.

Of course, the inventions according to the second and third aspects may be included in one air conditioning system.

According to a fourth aspect of the invention, in an air conditioning system for an aircraft formed of an air cycle machine, as an essential portion thereof, wherein a turbine and a compressor is connected by a single shaft, engine bleed air is introduced into the turbine to drive the air cycle machine, while the open air is introduced into the compressor to raise its pressure for a ventilation air.

According to this structure, since the open air is compressed by the turbine due to the engine bleed air and can be used as ventilation air, the usage of the engine bleed air can be reduced to thereby suppress the fuel penalty or consumption of the engine.

Incidentally, the open air is normally taken through a ram duct, but it may be taken by air-bleeding from a fan bleed.

DETAILED DESCRIPTION OF THE PREFERRED EMBODIMENTS

Hereunder, embodiments of the present invention are explained with reference to the drawings.

First Embodiment

Figure 2:
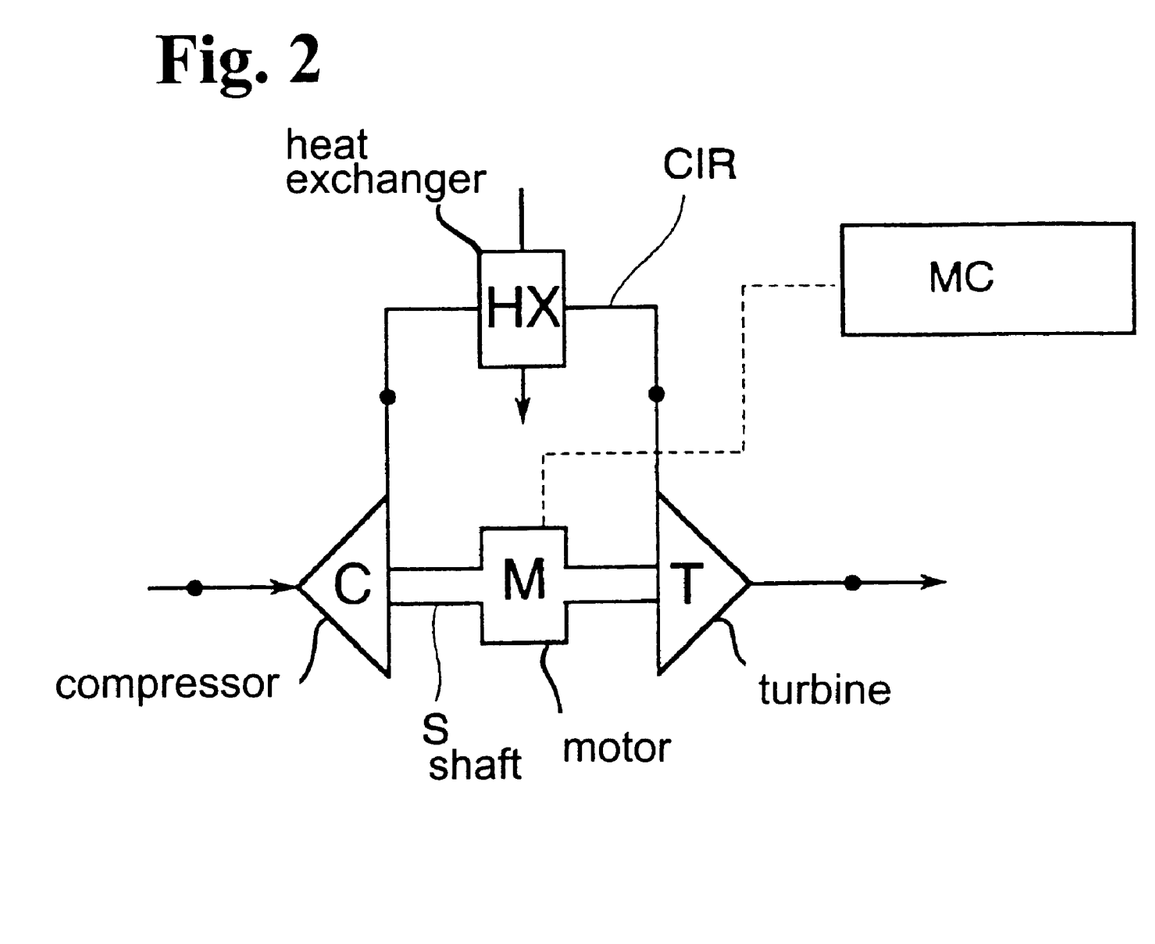
FIG. 2 is a block diagram showing a first embodiment according to the present invention.

First, FIG. 2 shows an air cycle machine (hereinafter referred to as "ACM") of a first embodiment. The machine is structured such that a compressor C and a turbine T are connected by a single shaft S equipped with an electric motor M, and an exit of the compressor C and an entrance of the turbine T are connected by a circuit CIR provided with a heat exchanger HX.

In a conventional machine, as shown in FIG. 1, a compressor C and a turbine T are connected by a shaft S having no motor function. Assuming that an engine bleed air BA has a temperature T=300° F., a pressure P=38 psia and a flow rate W=50 lb/min, there can be obtained conditioned or adjusted air having T=468° F. and P=65 psia at an exit of the compressor C; T=150° F. and P=65 psia at an entrance of the turbine T; and T=−17°F. and P =15 psia from an exit of the turbine T. At this time, the compressing work of the compressor C is 35 kW equal to the turbine power. In case the pressure of the engine bleed air BA lowers, its compression ratio and expansion ratio are decreased, which inevitably results in a temperature rise at the exit of the turbine T.

On the contrary, in the present embodiment as shown in FIG. 2, even if the pressure P of the engine bleed air BA is lowered to 25 psia (other conditions are the same as those of FIG. 1), in case an auxiliary energy of 32 kW is added from the electric motor M, there can be obtained conditioned air having temperature T=618° F. and pressure P=65 psia at the exit of the compressor C; temperature T=150° F. and pressure P 65 psia at the entrance of the turbine T; and regulated temperature T=−17° F. and regulated pressure P=15 psia from the exit of the turbine T, which are the same as the above-stated results. At this time, the compressing work of the compressor C is increased to a sum of 67 kW obtained by adding 32 kW of a motor power to 35 kW of a turbine power.

As described above, when the ACM of the present embodiment is used, even if the turbine power is lowered due to pressure decrease of the engine bleed air, by providing the turbine T with an electrical auxiliary power to obtain a predetermined turbine power, a compression ratio of the compressor C is increased, so that an expansion ratio of the turbine T is increased to thereby efficiently prevent the cooling ability from being lowered due to decrease in the exit temperature of the turbine T. Further, if necessary, in case a revolving speed control of the electric motor is carried out through a motor controller MC, efficient flight and suitable air conditioning can be obtained with a control of an auxiliary power rate.

Incidentally, the power supplement as described above can be effectively carried out with respect to a decrease in the flow rate of the engine bleed air.

Second Embodiment

Figure 3:
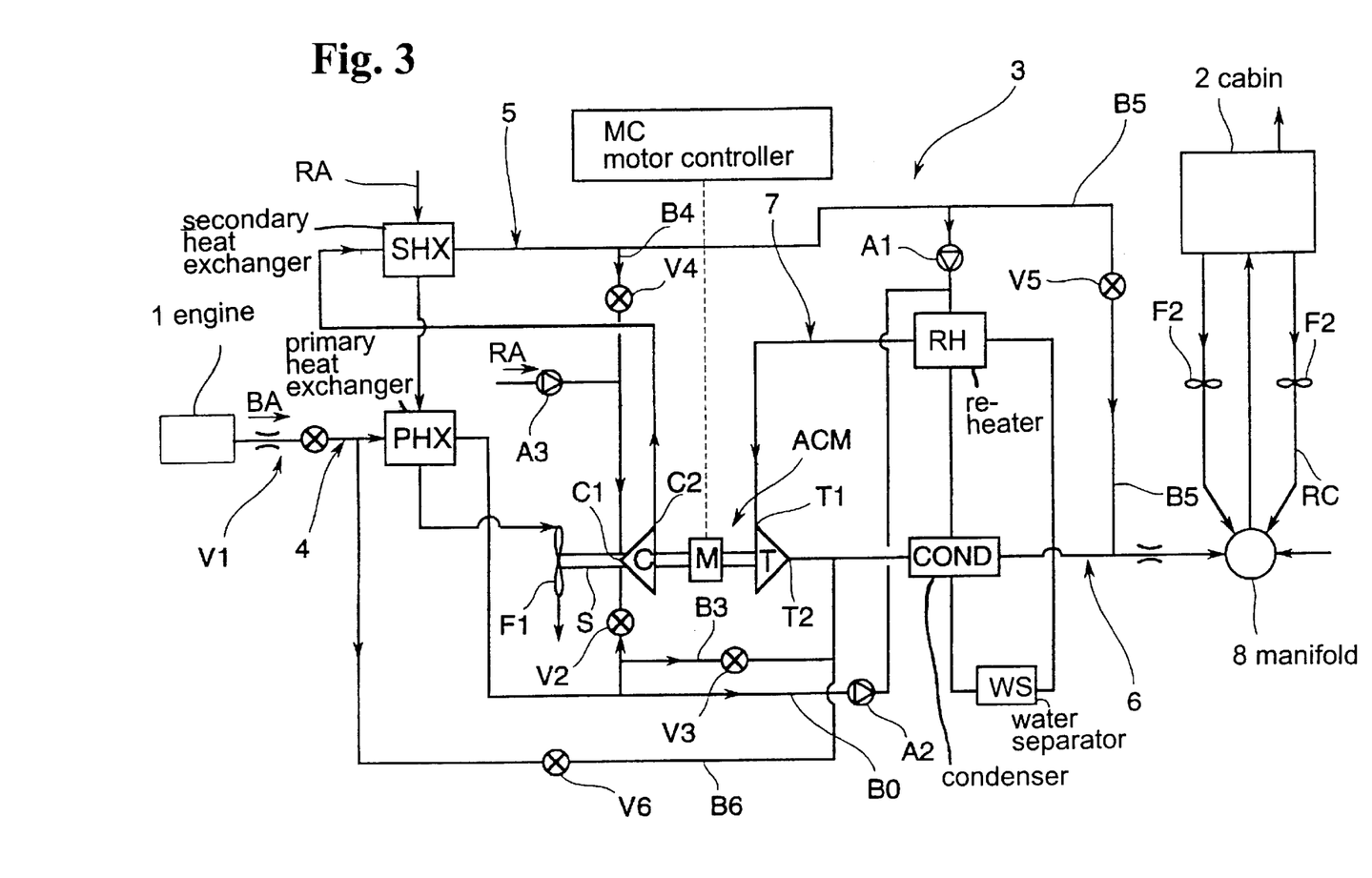
FIG. 3 is a block diagram showing a second embodiment according to the present invention.

Next, FIG. 3 shows a second embodiment of an air conditioning system to which the functions of the above air cycle machine are applied. The air conditioning system is structured such that an engine (including an auxiliary power portion) 1 and a pressurized cabin 2, such as an accommodation compartment and an electronics' chamber, are connected through an air conditioning portion 3. The air conditioning portion 3 comprises an air cycle machine ACM formed of a compressor C, a turbine T and a fan F1; a bleed air line 4 for introducing bleed air to an entrance C1 of the compressor C; a bootstrap circuit 5 for connecting an exit C2 of the compressor C and an entrance T1 of the turbine T; an air supply line 6 for transferring air discharged from an exit T2 of the turbine T to the pressurized cabin 2; and a dehumidifying mechanism 7 structured as parts of the bootstrap circulation 5 and the air supply line 6.

The bleed line 4 is provided with a bleed air flow rate controlling valve V1; a primary heat exchanger PHX for preventing an abnormally high temperature bleed air from flowing into the air conditioning portion 3 by cooling the engine bleed air BA through heat-exchange with ram air RA; and a mode switching valve V2 for regulating the bleed air line 4 on the side of the compressor C.

The air cycle machine ACM is structured such that the compressor C and the turbine T are connected by a single shaft S. The ACM further includes an electric motor M for inputting a power generated at the turbine T into the compressor C, and at the same time, for inputting an auxiliary power to the shaft S through a control of the motor controller MC.

The bootstrap circuit 5 is provided with a secondary heat exchanger SHX for effectively cooling air, the temperature of which has been raised by compression at the compressor C, through heat exchange with the ram air RA. Air passing through the secondary heat exchanger SHX is inputted into the turbine T, and its adiabatic expansion work is done at the turbine T.

The air supply line 6 connects the exit T2 of the turbine T and the pressurized cabin 2 through a manifold 8 and a recirculation circuit RC.

The dehumidifying mechanism 7 includes a re-heater RH, a condenser COND and a water separator WS. The condenser COND has a function of effectively cooling air, dew point of which is raised by being compressed at the compressor C in the bootstrap circuit 5, to condense its water content; and a function for raising an extremely low temperature state of air discharged from the exit T2 of the turbine T at the air supply line 6, so that heats of both airs are exchanged. The water separator WS has an internal structure for turning air flowing therein to a revolutional flow state, for example, wherein air, the water content of which is condensed by the condenser COND, is introduced to separate only the water contents having a large specific gravity by a centrifugal force of the revolutional flow to thereby allow only dehumidified air to flow out. The re-heater RH serves to pre-cool air proceeding to the condenser COND on an upper stream side of the bootstrap circuit 5, and to pre-heat air discharged from the water separator WS so as not to freeze at the exit T2 of the turbine T on the down stream side of the bootstrap circuit 5 to thereby carry out heat exchange of both airs.

Incidentally, ram air RA to be supplied to both heat exchangers SHX, RHX is taken by a fan F1 disposed at a ram air duct (not shown). In the present embodiment, the fan F1 is driven by the shaft S of the air cycle machine ACM. The air cycle machine structure wherein the single shaft S is provided with three vanes, such as the compressor C, the turbine T and the fan F1, is called as a three-wheel-type air cycle machine. On the other hand, the above-described dehumidifying mechanism 7 wherein dew point is raised in high pressure air to condense the water content, is called as a high pressure water separating (HPW) system.

Also, the re-circulation circuit RC is provided to circulate a part of air exhausted from the pressurized cabin 2, that is, to take a part of the exhaust air once discharged from the pressurized cabin 2 through a fan F2 to lead to the manifold 8 disposed near the end of the air supply line 6, so that the taken-in air is mixed with newly supplied air at a lower temperature.

In addition to the above-described structure, the air conditioning system of the present embodiment includes a by-pass circuit B4 for connecting an entrance of the compressor C and an exit of the secondary heat exchanger SHX through a valve V4; a by-pass circuit B6 for connecting an entrance of the primary heat exchanger PHX and an exit T2 of the turbine T through a valve V6; a by-pass circuit B5 for connecting the exit of the secondary heat exchanger SHX and an exit of the condenser COND through a valve V5; a by-pass circuit B3 for connecting the exit of the primary heat exchanger PHX and the exit of the turbine T through a valve V3; and a by-pass circuit BO for connecting the exit of the primary heat exchanger PHX and the exit of the secondary heat exchanger SHX. Ram air RA can be introduced into the by-pass circuit B4 from an outer portion. In the drawings, reference symbols A1, A2 and A3 represent check valves.

Next, operations of the air conditioning system are explained. In the air conditioning system, a normal mode and a ram mode can be selected through opening and closing of the mode switching valve V2. First, the normal mode is explained. In the normal mode, the valve V2 is fully opened and the valves V4, V5 are completely closed. The temperature of bleed air from the engine 1 is lowered at the primary heat exchanger PHX disposed at a beginning of the air bleeding line 4, and the pressure and quantity thereof are made constant to be inputted to the compressor C of the air cycle machine ACM to be compressed therein. Air flowing out from the compressor C is efficiently cooled down at the secondary heat exchanger SHX, and after air is further cooled down at the re-heater RH, air is inputted into the condenser COND to condense its water content. The water content is removed at the water separator WS disposed at the next step, and the dehumidified air is suitably heated by the re-heater RH to be inputted into the turbine T. Thereafter, an adiabatic expansion work of air is carried out at the turbine T, so that air is self-cooled. After passing through the condenser COND, the self-cooled air is mixed with the circulation air of the pressurized cabin 2 at the manifold 8, so that the self-cooled air becomes an optimum temperature to be introduced into the pressurized cabin 2 through the entrance thereof.

If necessary, the electric motor M is actuated by the motor controller MC to provide a suitable auxiliary power to the compressor C, so that a compression ratio of the compressor C is increased to raise a cooling ability of the air conditioning system.

Also, in case the ram air is taken in the sky, a mode is shifted to the ram mode. The procedure includes, first, closing the valve V2 gradually, so that the pressures at the entrance C1 and the exit C2 of the compressor C are decreased. Then, when the bleed air pressure at an entrance of the re-heater RH becomes higher than that at the exit C2 of the compressor C, the check valve A2 opens, so that the engine bleed air starts to flow directly to the entrance of the re-heater RH through the by-pass circuit Bo. Since the flow rate of the bleed air to the compressor C is temporarily decreased by regulating the valve V2, a temporary surge control is carried out by opening the valve V4. When the entrance C1 of the compressor C becomes lower than an open air pressure (pressure at a ram scoop entrance), the check valve A3 opens, so that the ram air starts to flow. Here, the valve V5 opens, so that the compressed open air and the bleed air expanded at the turbine T join near the manifold 8 to be supplied to the pressurized cabin 2 as conditioned or regulated air. Then, a speed of the electric motor is controlled by the motor controller MC to regulate the ram air flow rate, so that conditioned air having optimum temperature and pressure can be obtained.

Third Embodiment

Figure 4:
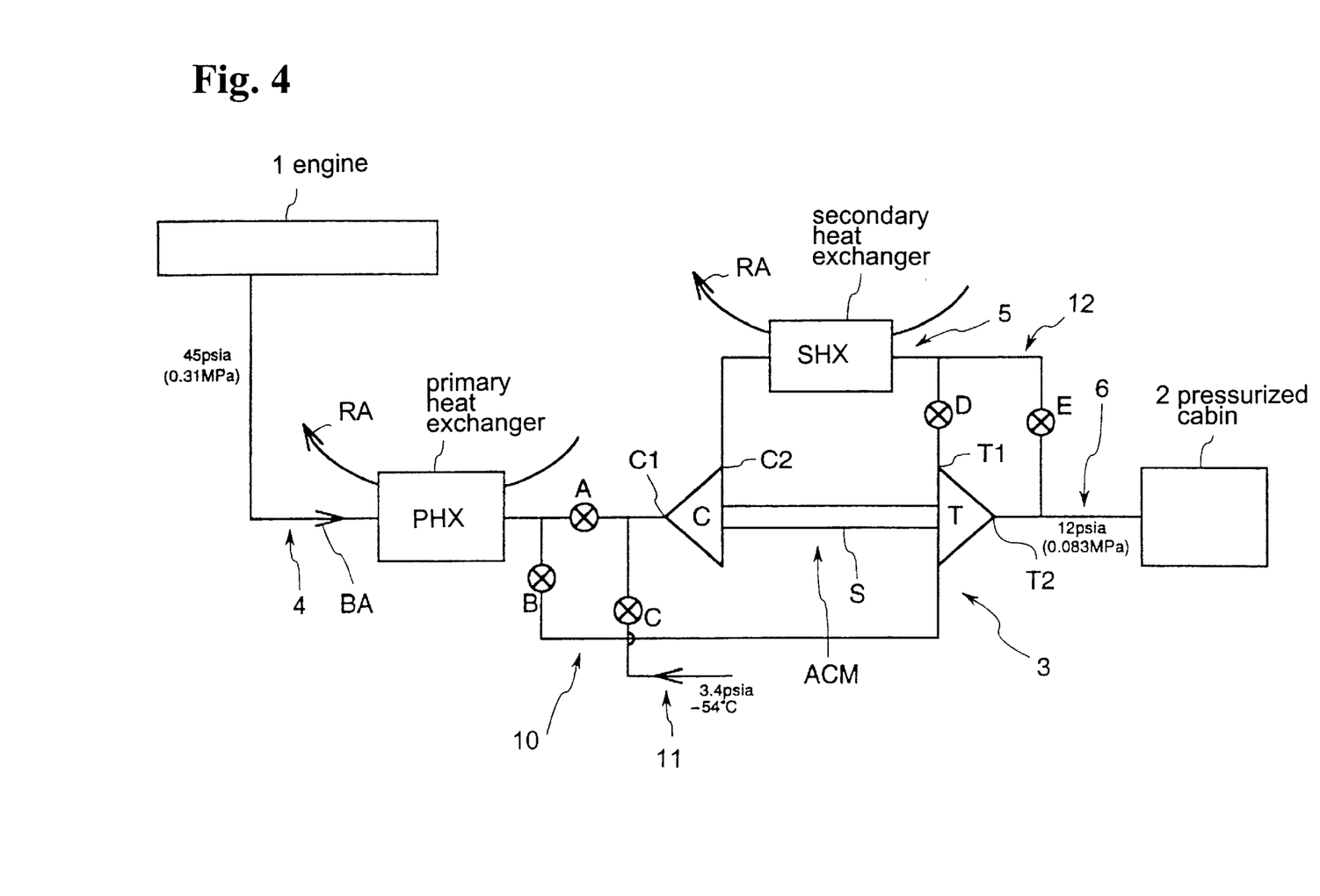
FIG. 4 is a block diagram showing a third embodiment according to the present invention.

In an air conditioning system as shown in FIG. 4, an engine 1 and a pressurized cabin 2, such as an accommodation compartment and electronics' chamber, are connected through an air conditioning portion 3. The air conditioning portion 3 includes an air cycle machine ACM having a compressor C and a turbine T, as an essential portion. To the air cycle machine ACM are connected an air bleeding line 4 for introducing bleed air to an entrance C1 of the compressor C; a bootstrap circuit 5 for connecting an exit C2 of the compressor C and an entrance T1 of the turbine T; and an air supply line 6 for transferring air discharged from an exit T2 of the turbine T to a pressurized cabin 2.

The air bleeding line 4 is provided with a primary heat exchanger PHX for preventing an abnormally high temperature bleed air from flowing into the air conditioning portion 3 by cooling through heat exchange of the engine bleed air BA and the ram air RA.

The air cycle machine ACM is formed of the compressor C and the turbine T connected therebetween with a single shaft, and a power generated at the turbine T can be inputted into the compressor C.

The bootstrap circuit 5 is provided with a secondary heat exchanger SHX for efficiently cooling air compressed and raised in its temperature at the compressor C through heat exchange with the ram air. Air passing through the secondary heat exchanger SHX is inputted into the turbine T where air is subjected to an adiabatic expansion work.

The air supply line 6 connects the exit T2 of the turbine T and the pressurized cabin 2.

In the structure of the air conditioning system as described above according to the present embodiment, there is provided a by-pass 10 diverged from a point between an exit of the primary heat exchanger PHX and the entrance C1 of the compressor C and directly connected to the entrance T1 of the turbine T without passing through the bootstrap circuit 5. The by-pass 10 is provided with valves B and A at an entrance of the by-pass 10 and on the upper stream side of the entrance C1 of the compressor C, and is connected to a ram air path 11 having a valve C for directly introducing open air into the entrance C1 of the compressor C. Further, the bootstrap circuit 5 is provided with a by-pass 12 diverged from a portion between the exit of the secondary heat exchanger SHX and the entrance T1 of the turbine T and directly connected to the air supply line 6 without passing through the turbine T. Valves E, D are provided at the entrance of the by-pass 12 and on the upper stream side of the entrance T1 of the turbine T, respectively.

Next, operations of the air conditioning system are explained. In the air conditioning system, a normal mode or a ram mode is selected through opening or closing of the valves A–E. First, the normal mode is explained. In the normal mode, the valves A, D are opened, and the valves B, C, E are closed. Thus, the bleed air BA from the engine 1 is lowered in its temperature at the primary heat exchanger PHX provided at an outset of the air bleeding line 4, and is inputted into the compressor C through the compressor's entrance C1 of the air cycle machine ACM to be compressed therein. Air discharged from the exit C2 of the compressor C is efficiently cooled at the secondary heat exchanger SHX, and inputted into the turbine T through the entrance T1 thereof. Thereafter, air does an adiabatic expansion work in the turbine T to be self-cooled. The self-cooled air becomes an optimum temperature and is discharged through the exit T2 of the turbine T to be introduced into the pressurized cabin 2.

Also, in case the ram air is taken in the sky, the mode is shifted to the ram air mode. In the ram air mode, the valves A, D are closed and the valves B, C, E are opened. Thus, the engine bleed air BA passes through the by-pass 10 to be directly introduced into the turbine T and to be used for driving the same. Then, open air is taken, through the ram air path 11, into the compressor C driven by the turbine power, is compressed therein, and is then cooled in the secondary heat exchanger SHX. After air passes through the by-pass 12, air is mixed with the engine bleed air BA from the turbine T to be ventilating air having optimum temperature and pressure and is introduced into the pre-pressurization cabin 2.

According to the structure as described above, the open air can be compressed by the turbine power due to the engine bleed air BA and compressed open air can be used as ventilating air. Thus, a quantity of the engine bleed air can be decreased and a fuel penalty or consumption of the engine can be suppressed.

For example, when an airplane is flying at an altitude of 35,000 ft (10,700 m) with M=0.76, in case an open air pressure is 3.4 psia (0.023 MPa) and a temperature is $-540°$ (in case of a standard day), a situation where the open air is compressed to 12 psia (0.083 MPa) which is a cabin pressure, is considered. When the engine air bleeding is 45 psia (0.31 MPa), in the present system, the engine air bleeding quantity can be reduced to about 27% as compared with the conventional system shown in FIG. 1. Also, in considering a total efficiency including a weight penalty or loss, ram penalty and electric penalty, a fuel consumption can be reduced to about 15%.

Also, the present embodiment is advantageous in cost since an electric motor is not used when the open air is taken in. In considering a situation where the electricity is cut off, the system according to the present embodiment is highly reliable.

Fourth Embodiment

Figure 5:
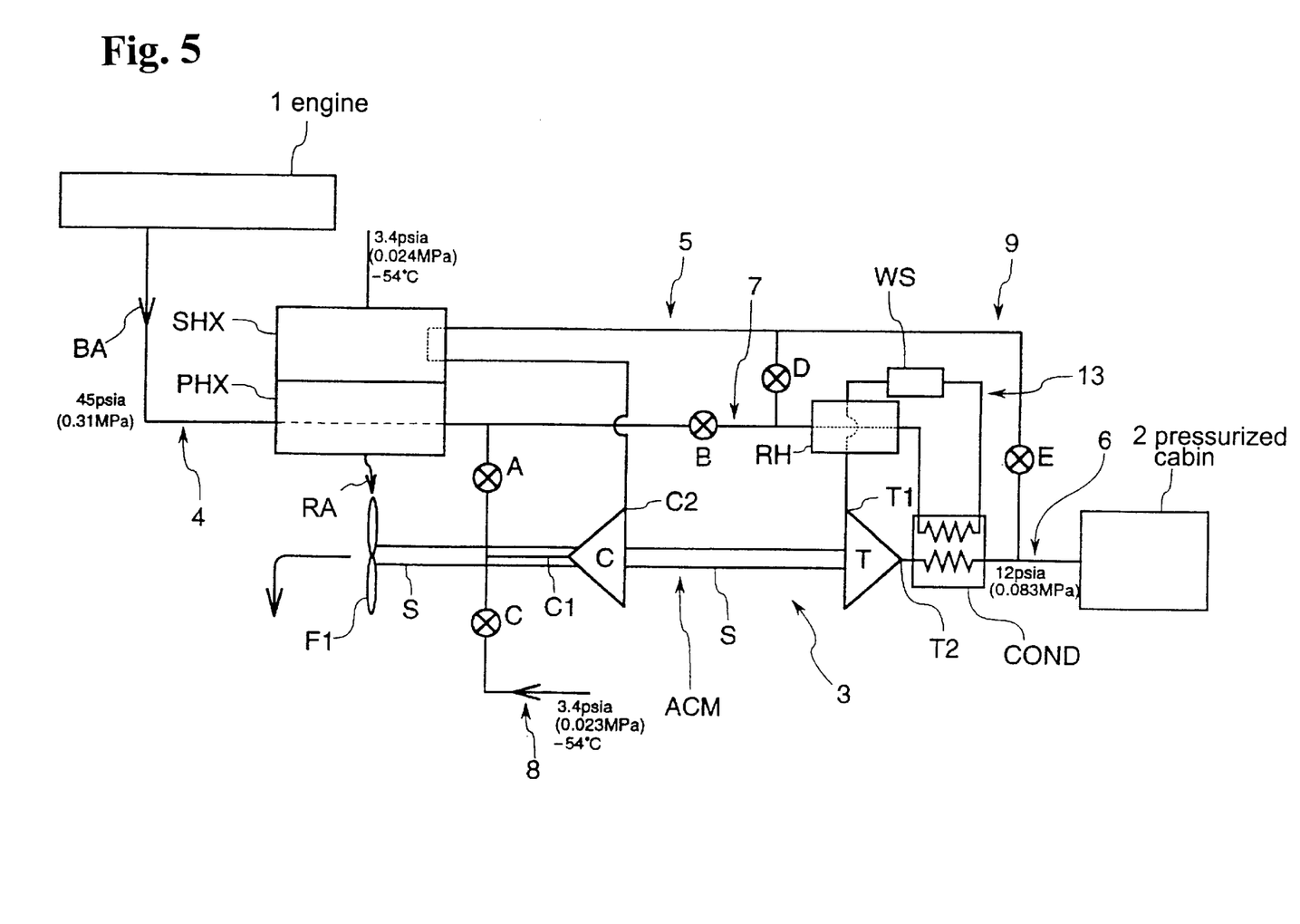
FIG. 5 is a block diagram showing a fourth embodiment according to the present invention.

An air conditioning system shown in FIG. 5 is a modified system of the air conditioning system according to the third embodiment, wherein an air cycle machine ACM is of a three-wheel type, and a dehumidifying mechanism 13 is provided to a portion of a bootstrap circuit 5. Incidentally, portions in common with those of the third embodiment are represented by the same symbols and explanations thereof are omitted.

In the present embodiment, ram air RA to be supplied to the primary and secondary heat exchangers PHX, SHX is taken through a fan F1 disposed at a ram air duct, and the fan F1 is attached to a shaft S of the air cycle machine ACM. The air cycle machine of this type is advantageous since an aircraft can positively take the open air therein in a hardstand especially in a hot day.

On the other hand, the dehumidifying mechanism 13 includes a re-heater RH, a condenser COND and a water separator WS disposed to the bootstrap circuit 5. The condenser COND carries out heat exchange for both airs for efficiently cooling one of the airs which has been compressed by the compressor C to increase in its dew point in the bootstrap circuit 5 so that a water content is condensed, and for increasing an extremely low temperature of the other air discharged from the exit T2 of the turbine T in an air supply line 6. The water separator WS has an inner mechanism wherein, for example, air flowing thereinto is made in a revolutional flow. Air, a water content of which is condensed at the condenser COND, is introduced into the water separator WS, and only a water content having a large specific gravity is separated by a centrifugal force to allow dehumidified air to mainly flow out. The re-heater RH carries out heat exchange of both airs for pre-cooling air directed to the condenser COND on the upper-stream side of the bootstrap circuit 5 and pre-heating another air flowing out of the water separator WS on the down-stream side of the circuit 5 to prevent air from freezing at the exit T2 of the turbine T.

As described hereinabove, the dehumidifying mechanism 13 for condensing the water content with a high dew point in a high pressure air is called as a high pressure water separating (hereinafter referred to as "HPWS") system.

Even in the air conditioning system wherein the above structure is added, fundamentally, in the same manner as in the third embodiment, the mode can be shifted to the normal mode or the ram mode by shifting the valves A–E. Thus, the engine bleed air of an aircraft during the high altitude flight can be specially decreased, the penalty or fuel consumption can be suppressed, and a highly efficient flight can be obtained under a high reliability.

Incidentally, specific structures of the various portions are not limited to the embodiments as shown in the drawings, and can be modified provided that they do not exceed the subject of the present invention. For example, in addition to taking the open air through a ram air duct, the open air may be taken from fan bleed of the engine. The fan bleed is provided with only a flow velocity for taking the open air to compress and is formed prior to a step where energies of compression and combustion are provided, so that a substantial influence to the engine bleed air can be suppressed to a low degree.

As described hereinabove, according to the present invention, since the bleed air pressure and flow rate are not required to change in order to obtain a predetermined cooling ability, while suppressing the influence on the flight ability due to variation of the engine bleed air and the fuel consumption, an efficient flight and suitable air conditioning can be obtained.

Also, according to the present invention, especially, during a flight at a high altitude, engine bleed air is introduced to drive the turbine, the power is transmitted to the compressor and the open air separately taken into the compressor is compressed therein. Thus, it is sufficient to intake minimum engine bleed air necessary for driving the air cycle machine. Therefore, in a passenger airplane requiring a large amount of ventilation air, an air bleeding quantity of the engine bleed air having a high energy level is reduced to thereby decrease a great deal of penalties or energy consumption. In its turn, the total system efficiency including other parameters or loss can be effectively improved. Also, since the air cycle machine is mechanically driven as much as possible, a cost can be reduced and its reliability can be improved as compared with a case where an electric system is employed.

Especially, if a sufficient quantity of electricity can be obtained, since a part of fresh air can be also taken from the atmosphere or ram, bleed air can be further reduced.

While the invention has been explained with reference to the specific embodiments of the invention, the explanation is illustrative and the invention is limited only by the appended claims.

What is claimed is:

1. An air conditioning system, comprising:
   an air cycle machine including a compressor for receiving and compressing air and a turbine having a shaft connected to the compressor and driven by engine bleed air,
   air intake means connected to the compressor for supplying at least one of open air and engine fan air to the compressor,
   bleed air supply means having a line connected to the turbine without passing through the compressor for supplying the engine bleed air to the turbine to operate the turbine by the engine bleed air without passing through the compressor in a ram mode, and
   means for mixing the at least one of the open air and the engine fan air compressed at the compressor with the bleed air passing through the turbine to obtain conditioned air.

2. An air conditioning system according to claim 1, wherein said air cycle machine further includes an electric motor attached to the shaft for actuating the compressor and the turbine when necessary.

3. An air conditioning system according to claim 2, wherein said bleed air supply means further includes a line for introducing the engine bleed air to the compressor in a normal mode, said compressor compressing the engine bleed air in the normal mode and supplying compressed air to the turbine to operate the same.

4. An air conditioning system according to claim 3, further comprising a first heat exchanger situated between the compressor and the turbine, said engine bleed air after being compressed by the compressor being cooled at the heat exchanger and supplied to the turbine to self-cool by an adiabatic expansion in the turbine to thereby obtain conditioned air without a high-pressure bleed air source.

5. An air conditioning system according to claim 4, further comprising a bootstrap circuit including said first heat exchanger and located between the compressor and the turbine, and a dehumidifying mechanism situated in the bootstrap circuit between the first heat exchanger and the turbine to remove humidity in air supplied to the turbine.

6. An air conditioning system according to claim 5, wherein said dehumidifying mechanism includes a re-heater, a condenser and a water separator situated in this order from the first heat exchanger to the turbine, a first passage extending from the water separator to the turbine through the re-heater, and a second passage extending from the turbine to a chamber through the condenser so that the condenser cools the air flowing from the compressor to condense a water content, and raises the air discharged from the turbine.

7. An air conditioning system according to claim 6, wherein said water separator has an internal structure for turning air therein to separate a water content by a centrifugal force of a revolutional flow of the air, and said re-heater operates to pre-cool the air proceeding to the condenser and pre-heat the air discharged from the water separator.

8. An air conditioning system according to claim 7, further comprising a second heat exchanger formed in a third passage to the compressor to cool the engine bleed air by ram air, a forth passage extending from the third passage between the second heat exchanger and the compressor to a portion before the re-heater, and a fifth passage for introducing the engine bleed air before the second heat exchanger to the second passage.

* * * * *